(12) United States Patent
Fukumoto

(10) Patent No.: US 8,807,622 B2
(45) Date of Patent: Aug. 19, 2014

(54) URGING DEVICE

(75) Inventor: Mitsuru Fukumoto, Utsunomiya (JP)

(73) Assignee: Nifco Inc., Yokohama-shi (JP)

( * ) Notice: Subject to any disclaimer, the term of this patent is extended or adjusted under 35 U.S.C. 154(b) by 0 days.

(21) Appl. No.: 13/824,094

(22) PCT Filed: Oct. 8, 2010

(86) PCT No.: PCT/JP2010/006038
§ 371 (c)(1),
(2), (4) Date: May 9, 2013

(87) PCT Pub. No.: WO2012/046283
PCT Pub. Date: Apr. 12, 2012

(65) Prior Publication Data
US 2013/0219795 A1     Aug. 29, 2013

(51) Int. Cl.
*B60R 7/06* (2006.01)
*E05F 1/10* (2006.01)
*F16F 1/12* (2006.01)

(52) U.S. Cl.
CPC ............. *E05F 1/1016* (2013.01); *B60R 7/06* (2013.01); *F16F 1/12* (2013.01)
USPC ..................... 296/37.12; 296/37.8

(58) Field of Classification Search
CPC .. B60R 11/00; B60R 2011/0005; E05B 83/30
USPC .................... 296/24.3, 37.8, 37.12
See application file for complete search history.

(56) References Cited

U.S. PATENT DOCUMENTS

| | | | |
|---|---|---|---|
| 5,385,378 A * | 1/1995 | Hakamada et al. | 296/37.12 |
| 6,076,878 A * | 6/2000 | Isano | 296/37.12 |
| 7,036,852 B2 * | 5/2006 | Cho | 292/33 |

FOREIGN PATENT DOCUMENTS

| | | |
|---|---|---|
| CN | 101734200 A | 6/2010 |
| JP | S58-043843 A | 3/1983 |
| JP | U-H05-37592 | 5/1993 |
| JP | H06-344830 A | 12/1994 |
| JP | 2010-215102 A | 9/2010 |

OTHER PUBLICATIONS

China Patent Office, "Office Action for CN 201080061104.3," Dec. 6, 2013.

* cited by examiner

*Primary Examiner* — Lori Lyjak
(74) *Attorney, Agent, or Firm* — Manabu Kanesaka

(57) ABSTRACT

An urging device is interposed between a first member and a second member. The urging device includes a supporting base formed on the first member, an abutting body including turning axes supported rotatably on the supporting base, and elastically contacting the second member, and an elastic member held in the abutting body and urging the abutting body by one end thereof in an elastically contacting direction. The supporting base includes bearing portions supporting the turning axes, and a locking portion locking the other end of the elastic member.

6 Claims, 9 Drawing Sheets

US 8,807,622 B2

URGING DEVICE

FIELD OF TECHNOLOGY

The present invention relates to an urging device which is interposed between two members, and carries out a wobbling-prevention, a positioning, and the like between the members.

BACKGROUND ART

Conventionally, in a glove box comprising a box main body placed in an opening portion of an instrument panel (hereinafter, called the instrument panel) of an automobile; and a lid which opens and closes the box main body, there is well-known the glove box provided with convex portions recoiling and abutting against an opening border portion of the instrument panel on both side portions of the lid (see Patent Document 1). The convex portions on the both side portions of the lid are realized as a resin piece which is integrally formed with the resin lid, or as a protruding portion of a leaf spring (spring material) in which a base end is attached to the lid. Thereby, due to a recoil force of the convex portions, a position in a right-and-left direction of the lid is modified so as to be capable of constantly holding a gap between the both side portions of the lid and the opening portion of the instrument panel.

PRIOR ART DOCUMENT

Patent Document

Patent Document 1: Japanese Unexamined Patent Publication No. H05-37592

SUMMARY OF THE INVENTION

Problems to be Solved by the Invention

However, in the aforementioned conventional technology, in a case where the convex portions on the both side portions of the lid are realized as the resin piece, since a resin material is susceptible to a creep, if a deformation amount of the resin piece increases with time, there was a problem that it was difficult to constantly hold the gap between the both side portions of the lid and the opening portion of the instrument panel.

On the other hand, in a case where the convex portions on the both side portions of the lid are realized as the protruding portion of the leaf spring, since a metal leaf spring directly abuts against the resin instrument panel, there was a problem that a surface of the instrument panel might be scratched. Also, since a range of an amount of deflection in an elastic deformation area of the leaf spring is relatively narrow, there was a problem that leaf spring was susceptible to the creep (a permanent deformation) because the gap between the both side portions of the lid and the opening portion of the instrument panel narrowed and the like. Moreover, in a case of the leaf spring, since a load change is generally large relative to a change of the amount of deflection, there was a problem that it was difficult to set an operation load constantly when the lid was opened and closed.

Thereby, the present applicant has already developed an urging device which is an urging body interposed between a first member and a second member, and comprises a base attached to the first member; a resin abutting body supported in the base to be capable of freely swaying, and elastically contacting the second member; and a torsion coil spring urging the abutting body in the aforementioned elastically contacting direction, and has already filed an application (Japanese Patent Application No. 2009-064177).

The urging body has the advantages that while stably generating an urging force required for carrying out a wobbling-prevention, a positioning, and the like between two members, it becomes possible to realize a high durability, and also that a resin member will not be scratched. On the other hand, as for the urging body, there was a problem that an assembly of each component element (the base, the abutting body, and the torsion coil spring), or an attachment of the urging body relative to a member (the glove box and the like) after the assembly thereof, was somewhat complicated.

The present invention has been made with the view to such conventional technical problems, and an object of the present invention is to provide an urging device preventing the member, which becomes an attachment subject, from being scratched, and also easily attached relative to the attachment subject.

Means for Solving the Problems

In order to solve the aforementioned problems, the first invention is an urging device (1) which is interposed between a first member (2) and a second member (3), and comprises a structure of including a supporting base (11) formed in the first member; an abutting body (13) including a turning axis (12) supported rotatably in the supporting base, and elastically contacting the second member; and an elastic member (14) held in the abutting body and urging the abutting body by one end thereof (14b) in the elastically contacting direction. The supporting base has a structure including bearing portions (21 and 21) supporting the turning axis; and a locking portion (23) locking the other end (14c) of the elastic member.

Also, as for a second invention, the bearing portions can have a structure including an axis hole (22) to attach the turning axis, and whose one portion (22a) of an outer periphery thereof is open to be capable of inserting the turning axis.

Also, as for a third invention, the elastic member can have a structure of a torsion coil spring (14).

Also, as for a fourth invention, the abutting body can have a structure including a pair of supporting walls (33 and 33) supporting both ends of a coil portion of the torsion coil spring, and in each supporting wall, a spring supporting axis (41) inserted into both ends of the coil portion of the torsion coil spring is respectively projected inwardly. Also, at least one of the supporting walls can have a structure including an elastic piece (46) divided by a slit (45) formed around the spring supporting axis.

Also, as for a fifth invention, the axis hole is divided by a concave portion (22) which opens inwardly, where the turning axis is projected outwardly from the elastic piece.

Also, as for a sixth invention, the abutting body can have a structure of surrounding at least one portion of the turning axis from an outside, and also of including attachment guide portions (31a and 32a) slidably contacting outer peripheral borders of the bearing portions.

Effect of the Invention

According to the first invention, the abutting body holding the elastic member has the structure of being attached to the bearing portions of the supporting base provided in the first member through the turning axis thereof so as to provide excellent operational effects to prevent a member which becomes an attachment subject from being scratched, and also to facilitate an attachment relative to the attachment subject.

Also, according to the second invention, an operator can easily insert the turning axis of the abutting body into the axis hole from an opening portion of the axis hole so as to facilitate an attachment operation of the abutting body relative to the supporting base.

Also, according to the third invention, by using the torsion coil spring, while stably generating an urging force required for carrying out a wobbling-prevention, a positioning, and the like between two members, it becomes possible to realize a high durability.

Also, according to the fourth invention, a simple structure can facilitate an operation of holding the torsion coil spring in the abutting body by an operator.

Also, according to the fifth invention, the torsion coil spring is attached relative to the spring supporting axis in a compressed state in an axis direction, so that at least one turning axis is urged outwardly (i.e., pressed against a bottom of the concave portion) so as to prevent the abutting body, which has been attached to the supporting base, from wobbling.

Also, according to the sixth invention, when the abutting body is attached relative to the supporting base, a turning operation of the abutting body relative to the supporting base is guided by the attachment guide portions so as to further facilitate the attachment operation of an operator.

EMBODIMENTS FOR CARRYING OUT THE INVENTION

Hereinafter, an urging device according to the present invention will be explained with reference to drawings. As for the explanation, directional terms follow directions shown by arrows in alignments of an urging device 1 and component elements thereof shown in FIG. 6 unless otherwise noted.

Figure 1:
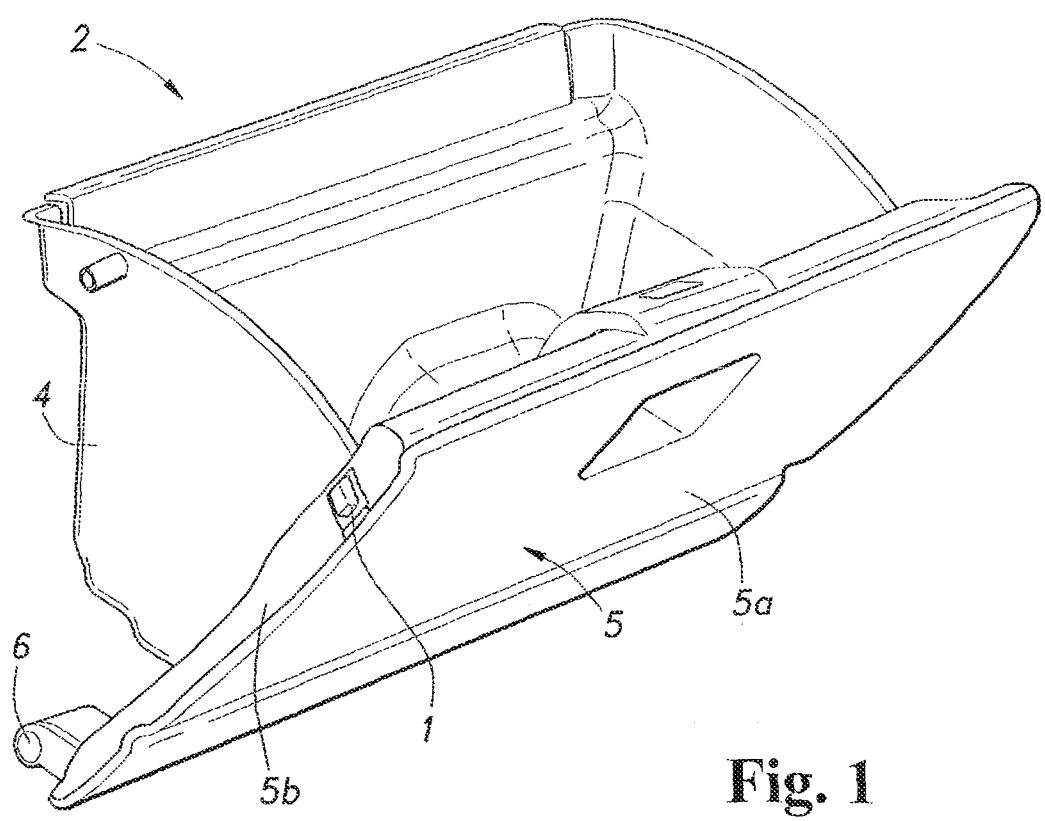
FIG. 1 is a perspective view of a glove box comprising an urging device.
Figure 10:
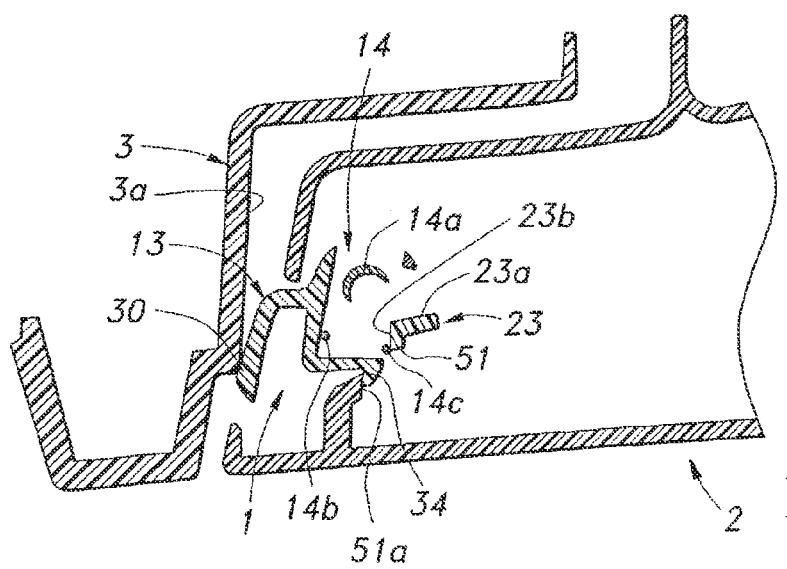
FIG. 10 is a cross-sectional view showing a usage state of the urging device relative to the instrument panel and the glove box.

The urging device 1 is interposed between two members which face each other with a predetermined gap, and in the present embodiment, as shown in FIG. 10, the urging device 1 is interposed between a glove box 2 for an automobile and instrument panel 3. As shown in FIG. 1, the glove box 2 includes a resin box main body 4; and a resin lid 5 connected to a vehicle interior side of the box main body 4, and also fitted into an attachment opening portion 3a (see FIG. 10) of the instrument panel 3. The lid 5 includes a surface panel 5a disposed on the vehicle interior side; and an inside panel 5b overlaid and attached to an inner side of the surface panel 5a. The glove box 2 turns as a center of a supporting axis 6 provided in the lid 5 to be freely opened and closed relative to the instrument panel 3. In FIGS. 1 and 10, there is shown only a condition wherein the urging device 1 is attached to a left side of the lid 5. However, urging device 1 is also attached to a right side in a similar fashion.

Figure 6:
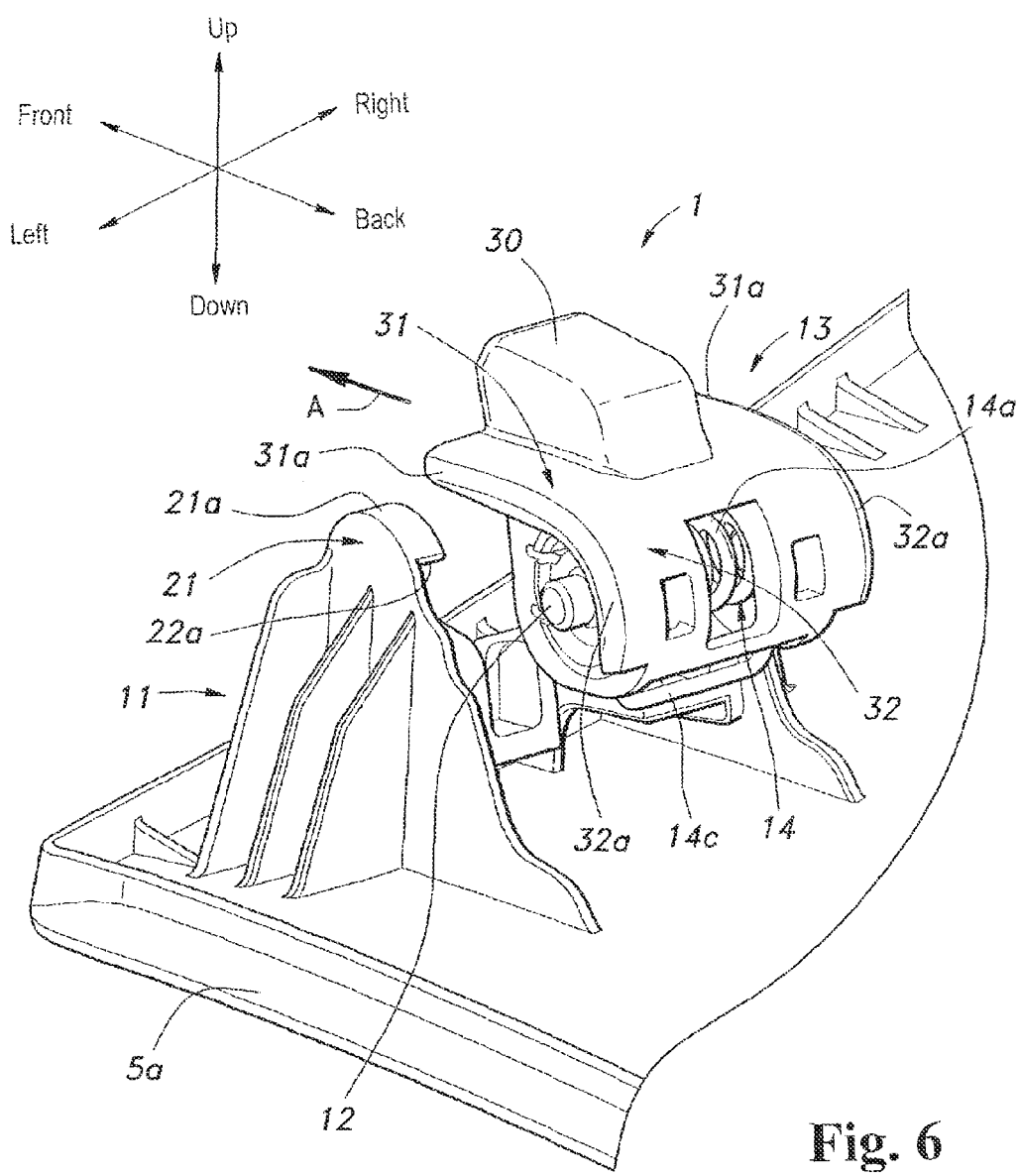
FIG. 6 is a perspective view showing one of attachment procedures of the abutting body relative to the supporting base.

For example, as shown in FIG. 6, the urging device 1 mainly comprises a supporting base 11 integrally formed in the glove box 2; a resin abutting body 13 including turning axes 12 and 12 supported rotatably in the supporting base 11, and also elastically contacting the instrument panel 3; and a torsion coil spring 14 held in the abutting body 13, and urging the abutting body 13 in an elastically contacting direction at one end thereof.

Figure 2A:
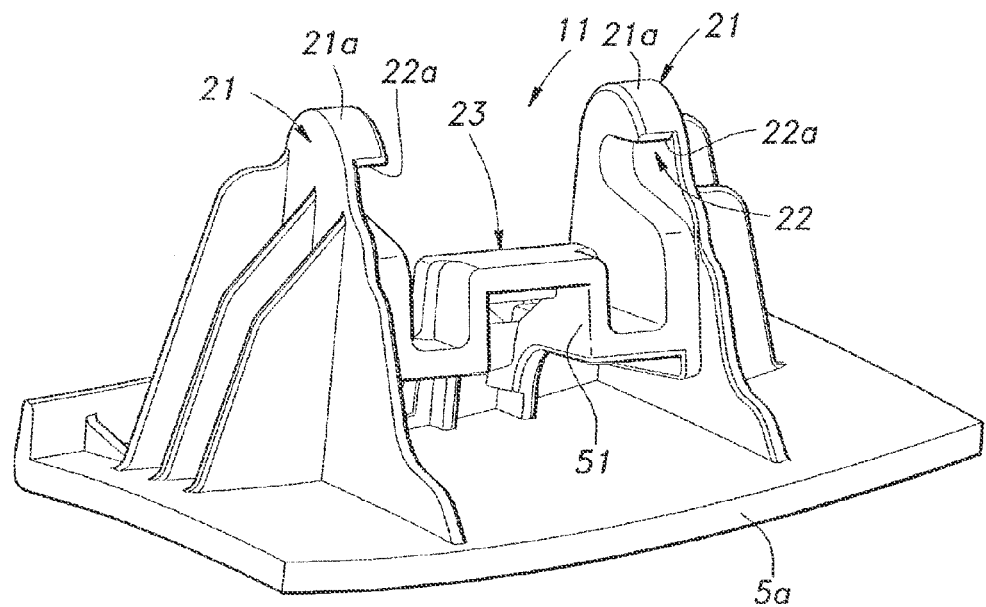
FIG. 2(A) is a perspective view of a back surface side.
Figure 2B:
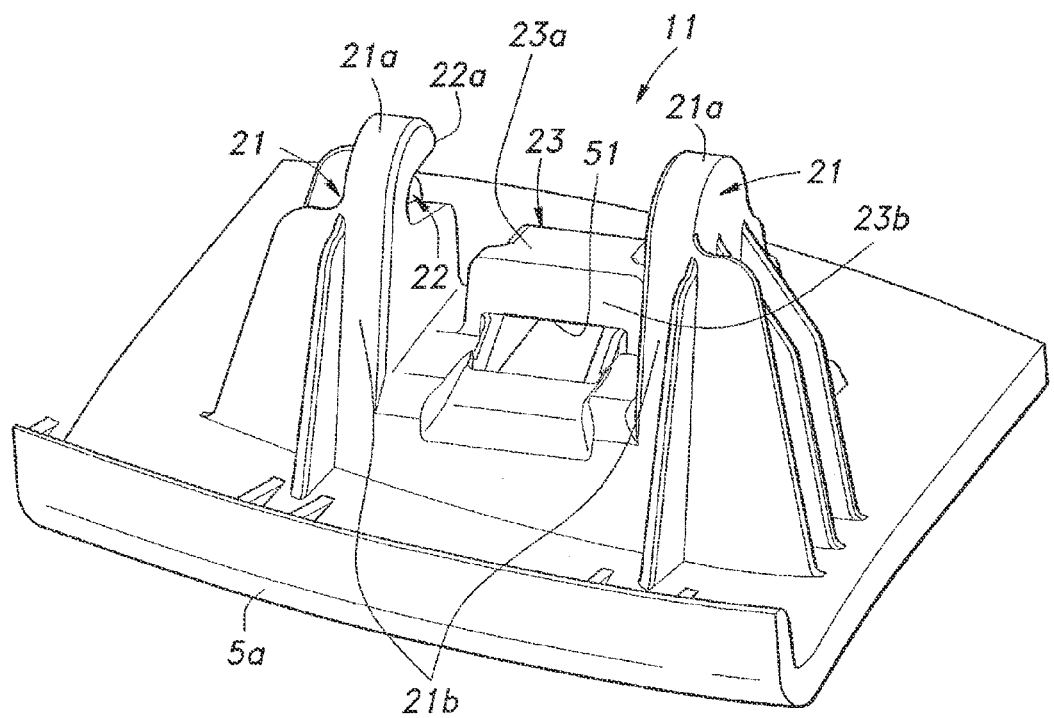
FIG. 2(B) is a perspective view of a front surface side, of a supporting base formed in an instrument panel.

As shown in FIGS. 2(A) and 2(B), the supporting base 11 includes a pair of bearing portions 21 and 21 projected from an inner surface of the surface panel 5a of the glove box 2. The bearing portions 21 and 21 have a right-and-left symmetrical shape, and are disposed by facing each other with a predetermined gap. In upper portions of the bearing portions 21 and 21, there are provided concave portions 22 functioning as axis holes supporting the turning axes 12 of the abutting body 13. The concave portions 22 mutually open toward the inner side, and also one portion (a back side) of an outer periphery thereof is opened so as to have a U shape or a C shape. Also, the supporting base 11 includes a spring locking block 23 projected lower than the bearing portions 21 and 21 from the inner surface of the surface panel 5a between the bearing portions 21 and 21. Incidentally, there is necessarily no need for the axis holes for supporting the turning axes 12 of the abutting body 13 to have a bottom such as the concave portions 22, and the axis holes for supporting the turning axes 12 of the abutting body 13 may be formed as a hole passing through in a right-and-left direction.

Figure 3A:
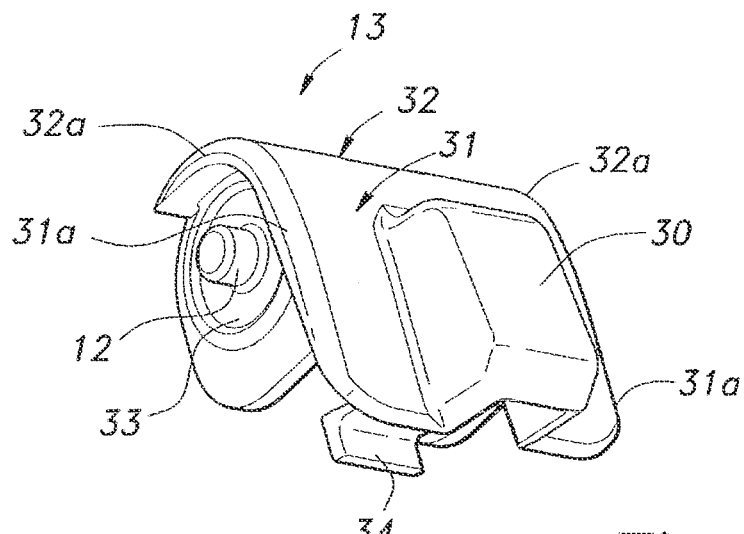
FIG. 3(A) is a perspective view of an upper surface side.
Figure 3B:
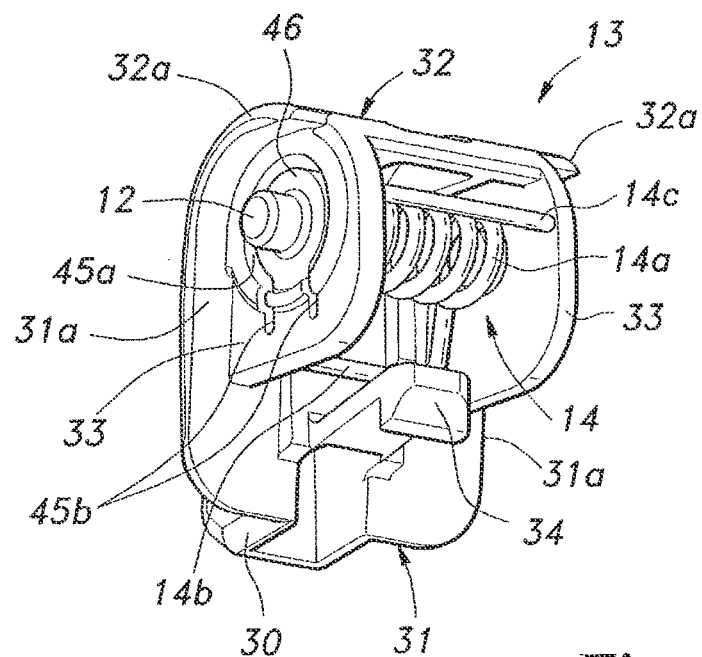
FIG. 3(B) is a perspective view of a lower surface side, of an abutting body.

As shown in FIGS. 3(A) and 3(B), the abutting body 13 mainly comprises a flat-plate-like upper wail in which a convex portion 30, which elastically contacts the instrument panel 3 (see FIG. 10), is formed; a curved back wall 32 continuing to a back end of the upper wall 31; and a right-and-left pair of supporting walls 33 and 33 disposed on an inner surface side of the upper wall 31 and the back wall 32, and supporting the torsion coil spring 14. The upper wall 31, the back wall 32, and the supporting walls 33 and 33 divide a housing space of the torsion coil spring 14 in the abutting body 13.

On a lower surface of the upper wall 31, there is projected a locking claw 34 which is locked in the instrument panel 3 (see FIG. 10). Also, on right-and-left-side borders of the upper wall 31 and the hack wall 32, there are formed overhang portions 31a and 32a overhanging to right and left of the supporting walls 33 and 33. The overhang portions 31a and 32a surround at least one side (here, an upper side and a back side) of the turning axes 12 and 12 from an outside, and also inner surfaces thereof are provided so as to slidably contact outer peripheral borders 21a in the upper portions of the bearing portions 21 and 21. The inner surfaces of the overhang portions 32a are constituted in such a way as to have the same curvature as the outer peripheral borders 21a of the bearing portions 21 and 21.

Figure 4:
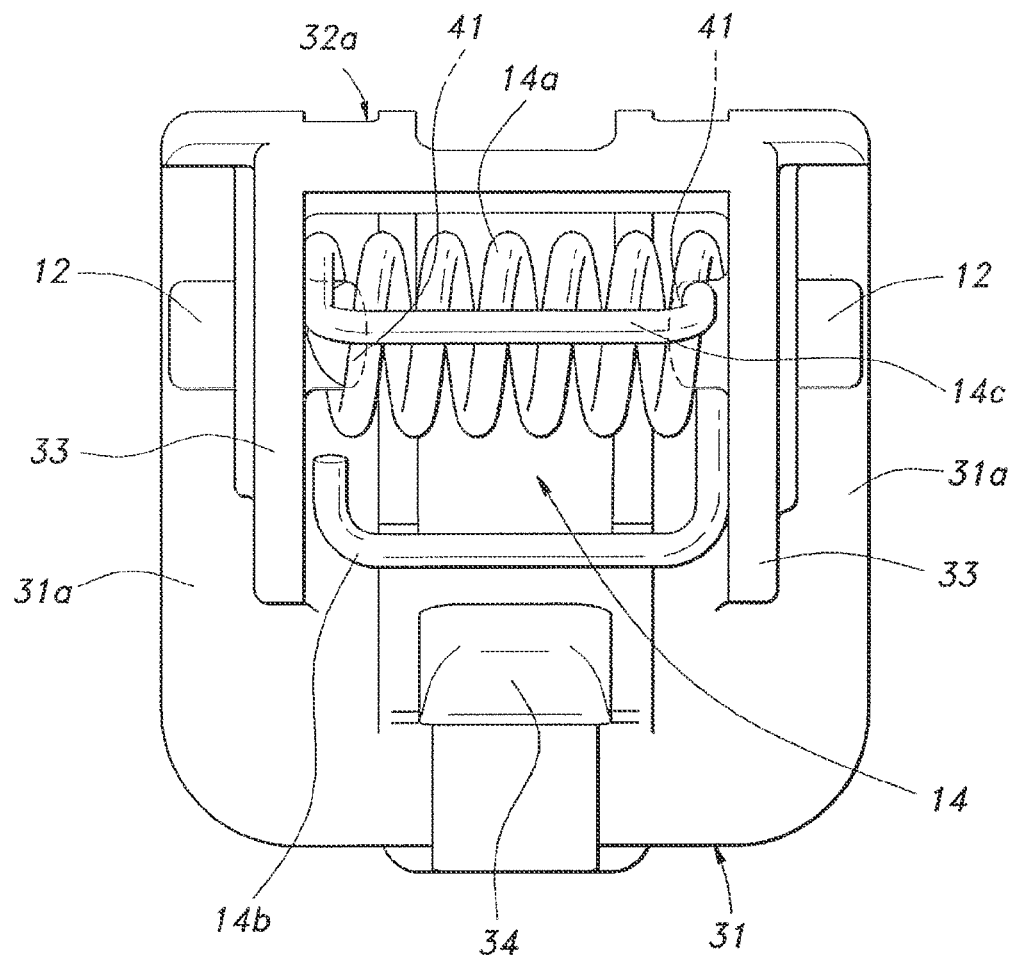
FIG. 4 is a bottom view of the abutting body.

As shown in FIG. 4, the turning axes 12 and 12 are mutually disposed on the same axis, and respectively projected outwardly (toward a right or left) from outer surfaces of the supporting walls 33 and 33. End positions of the turning axes 12 and 12 approximately correspond to end borders of the overhang portions 32a of the upper wall 31. Also, on inner surfaces of the supporting walls 33 and 33, there are respectively projected inwardly spring supporting axes 41 and 41 which are disposed on the same axis as the turning axes 12 and 12, and also inserted in both ends of a coil portion 14a of the torsion coil spring 14. On both ends of the torsion coil spring 14 made of spring steel, there are formed two arm portions 14b and 14c which extend approximately in the same direction as the coil portion 14a. The arm portion 14b on one end side is locked in an inside of the upper wall 31 of the abutting body 13. Also, as shown in FIG. 10, the arm portion 14c on the other end side is locked in the spring locking block 23 of the supporting base 11 wherein the abutting body 13 is attached.

Figure 5:
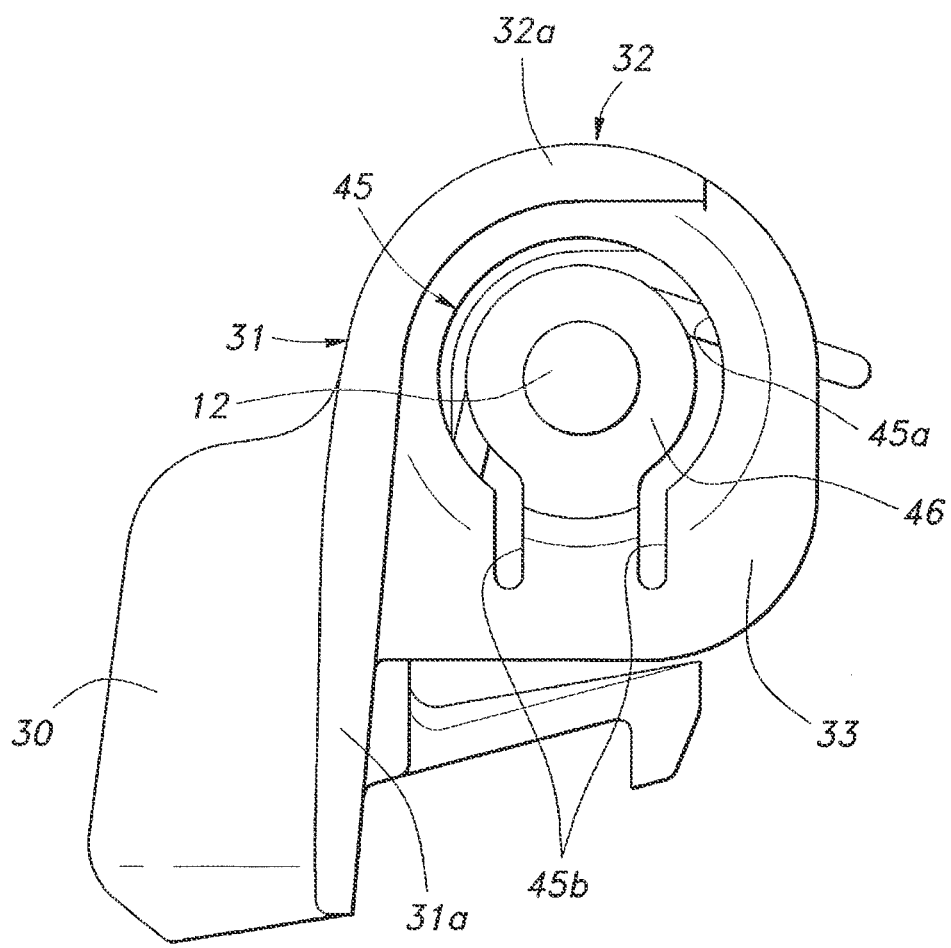
FIG. 5 is a left side view of the abutting body.

As shown in FIG. 5, in the supporting wall 33 on the left side, there is formed a slit 45 around the spring supporting axis 41 (same applies to the turning axis 12). The slit 45 includes a circular portion 45a surrounding the spring supporting axes 41 and 41 from the outside; and linear portions 45b and 45b respectively extending downwardly from both ends of the circular portion 45a so as to form an elastic piece 46 in a center portion of the supporting wall 33. A base end portion, which is positioned between the linear portions 45b and 45b of the slit 45, elastically deforms so as to allow the elastic piece 46 to be displaced in an axis direction (the right-and-left direction) of the spring supporting axis 41. Due to such displacement of the elastic piece 46, an operation of allowing the torsion coil spring 14 to be held in the abutting body 13 (i.e., attaching to the spring supporting axes 41 and 41) becomes easier. Incidentally, the same elastic piece as mentioned above may be provided in the supporting wall 33 on the right side.

Next, an attachment method of the abutting body 13 relative to the supporting base 11 will be explained. An attachment of the abutting body 13 is carried out according to a series of procedures shown in FIGS. 6 to 9.

Figure 7:
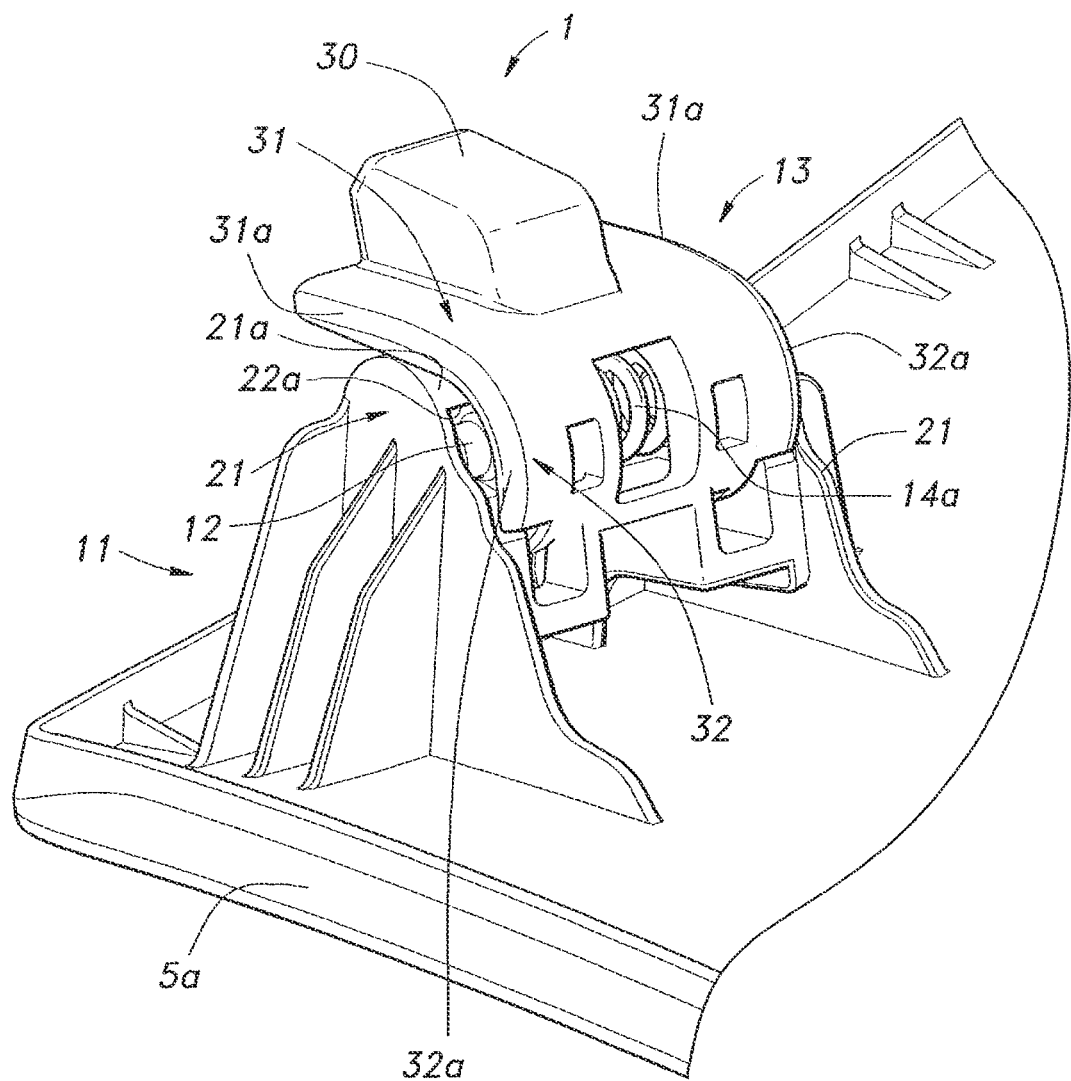
FIG. 7 is a perspective view showing one of the attachment procedures of the abutting body relative to the supporting base.

First, as shown in FIG. 6, an operator moves the abutting body 13 in which the torsion coil spring 14 is held in a direction of an arrow A from the back of the supporting base 11. Thereby, as shown in FIG. 7, the turning axes 12 and 12 of the abutting body 13 are inserted into the concave portions 22 from open portions 22a of the concave portions 22 of the bearing portions 21 and 21. At that time, the operator places the arm portion 14c on an upper wall 23a. (see FIG. 2(B)) of the spring locking block 23 while applying a load in a direction wherein the arm portion 14c of the torsion coil spring 14 approaches the arm portion 14b. The arm portion 14c slides forward on the upper wall 23a in association with a movement of the abutting body 13 and after that, the arm portion 14c climbs over the upper wall 23a so as to abut against a front wall 23b of the spring locking block 23. In that case, as shown in FIG. 10, the upper wall 23a inclines in such a way that a front side (the left side in FIG. 10) of an upper surface thereof approaches the surface panel 5a further so as to facilitate a sliding of the abutting body 13 in the upper wall 23a, and a movement to a front wall 23b side after the sliding. Also, at that time, the abutting body 13 moves forward in a state wherein inner surfaces of the overhang portions 31a have slid and contacted the outer peripheral borders 21a in the upper portions of the bearing portions 21 and 21. In this way, insertions of the bearing portions 21 and 21 into the concave portions 22 are guided.

Figure 8:
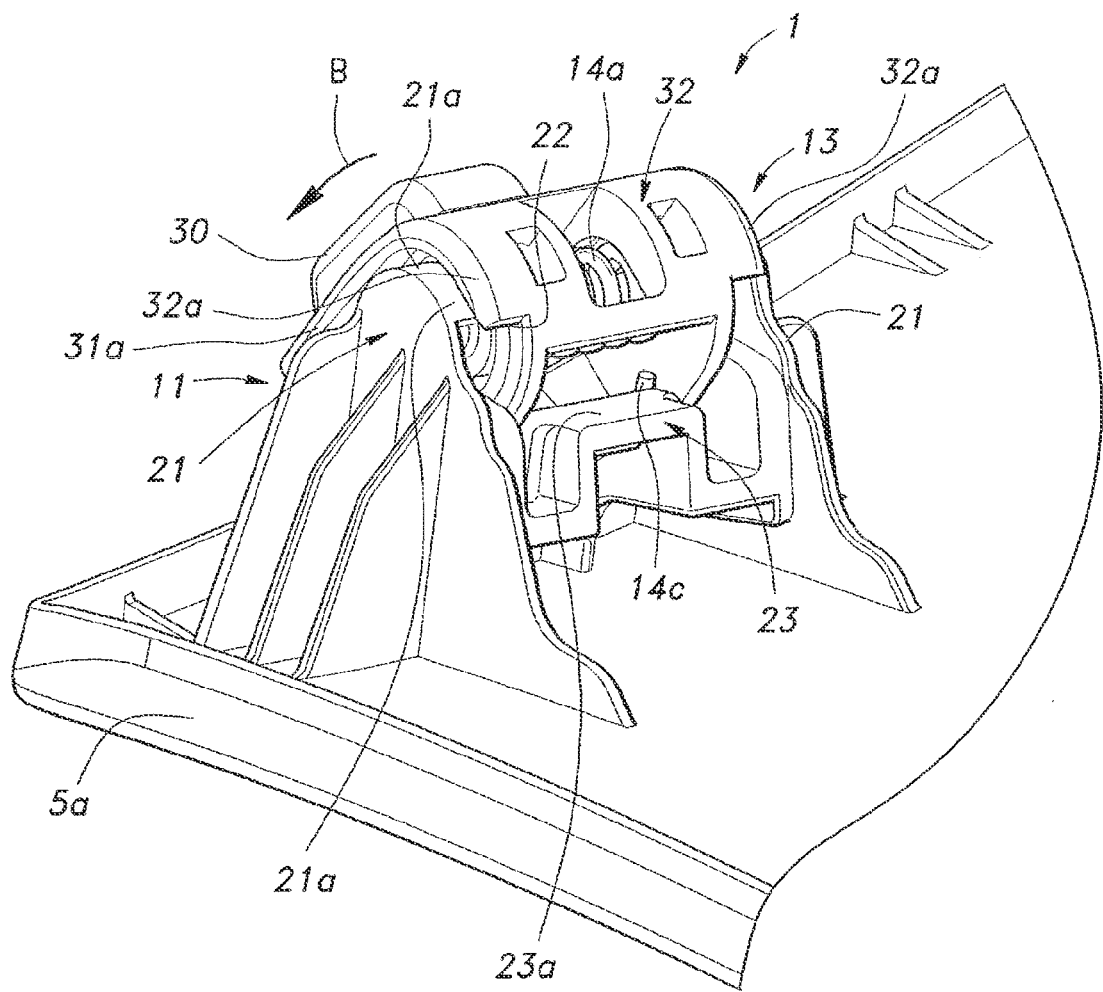
FIG. 8 is a perspective view showing one of the attachment procedures of the abutting body relative to the supporting base.

Next, as shown in FIG. 8, the operator turns the abutting body 13 in a direction of an arrow B as a center of the turning axes 12 and 12. At that time the abutting body 13 turns in a state where the inner surfaces of the overhang portions 32a slidably contact the outer peripheral borders 21a in the upper portions of the bearing portions 21 and 21. In this way, turning of the abutting body 13 as the center of the turning axes 12 and 12 is guided.

Figure 9:
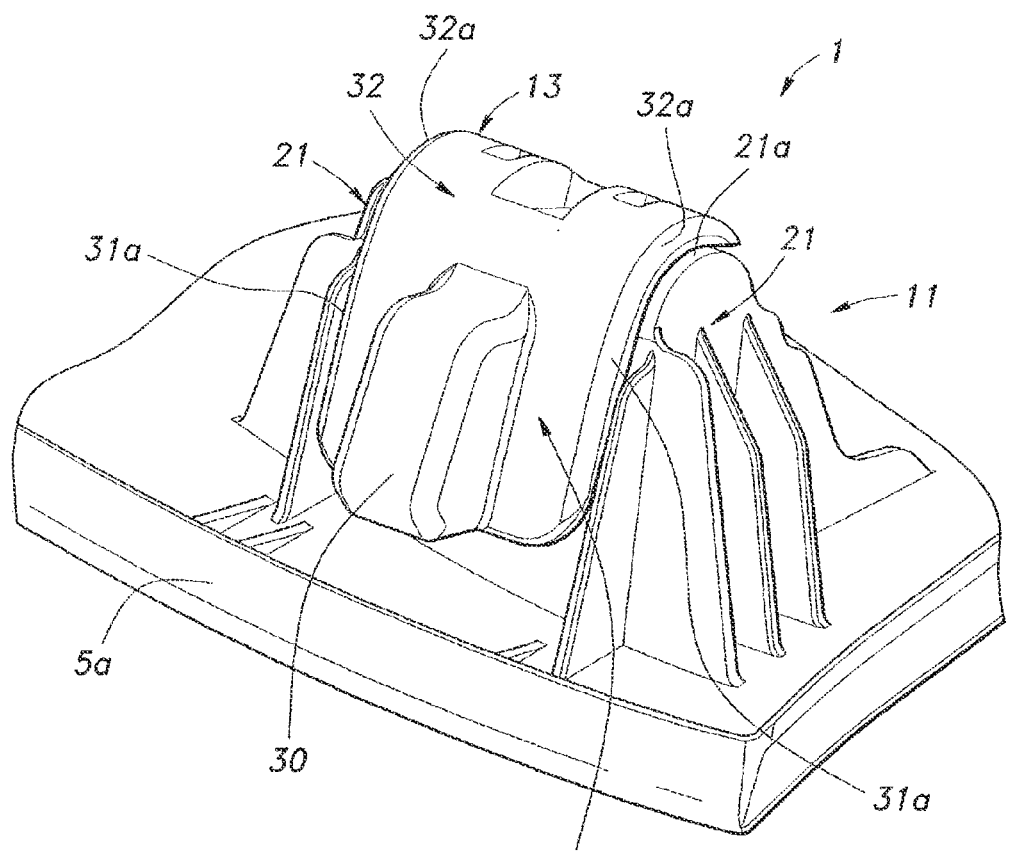
FIG. 9 is a perspective view showing one of the attachment procedures of the abutting body relative to the supporting base.

Thus, the attachment of the abutting body 13 relative to the supporting base 11 (i.e., an assembly of the urging device 1) is completed, and the abutting body 13 is fixed relative to the supporting base 11 in a state shown in FIG. 9. More specifically, in the abutting body after completing the attachment, the inner surfaces of the overhang 31a abut against outer peripheral borders 21b (see FIG. 2(B)) in front portions of the bearing portions 21 and 21 so as control the turning in a further front direction. On the other hand, as shown in FIG. 10, the locking claw 34 is locked in a lower border 51a of a locking hole 51 formed in the front wall 23b of the spring locking block 23 so as to control the abutting body 13 from turning in an opposite direction is back direction). In the urging device 1 whose assembly has been completed in that manner, the torsion coil spring 14 urges in a direction wherein a lower portion (a base end) of the supporting base 11 and a front portion (a free end) of the abutting body 13 are mutually separated as the center of the turning axes 12 and 12.

The urging device 1 with the aforementioned structure is interposed between the glove box 2 and the instrument panel 3, and the convex portion 30 of the abutting body 13 elastically contacts a surface of an opening portion of the instrument panel 3 so as to allow to carry out a wobbling-prevention, a positioning, and the like between both members.

Also, in the aforementioned urging device 1, the abutting body 13, in which the torsion coil spring 14 is held, has a structure of being attached to the bearing portions 21 and 21 of the supporting base 11 provided in the glove box 2 through the turning axes 12 and 12 so as to prevent the instrument panel 3 from being scratched, and also facilitate the attachment relative to an attachment subject for an operator. Also, since the supporting base 11 is integrally formed in the glove box 2, there is advantage that the number of components can be reduced. As a device for urging the abutting body 13, a leaf spring or an elastic member made of resin and the like can be used. However, especially, by using the torsion coil spring 14, while stably generating an urging force required for carrying out the wobbling-prevention, the positioning, and the like between the glove box 2 and the instrument panel 3, it becomes possible to realize a high durability.

Also, in the urging device 1, the elastic piece 46 is provided in the center portion of the supporting wall 33, and also the axis holes, which support the turning axes 12 and 12 of the abutting body 13, have a structure of being formed by the concave portions 22 which open. inwardly. Accordingly, the torsion coil spring 14 is attached relative to the spring supporting axes 41 and 41 in a state of being compressed in the axis direction (i.e., an axis-directional size of the coil portion 14a of the torsion coil spring 14 in an initial state is larger than a size between the right-and-left supporting walls 33 and 33), so that at least the turning axis 12 on the left side is urged outwardly (pressed against the bottom of the concave portion 22) so as to prevent the abutting body 13 which has been attached to the supporting base 11 from wobbling.

Although the present invention was explained in detail based on a specific embodiment, the aforementioned embodiment is absolutely an illustrated example, and the present invention is not limited to the embodiments described hereinabove. For example, the urging device according to the present invention can be interposed between not only the glove box 2 and the instrument panel 3 described hereinabove, but also between two arbitrary members. Also, contrary to the aforementioned embodiments, the urging device can have a structure of being provided on an instrument panel 3 side, and abutting the abutting body against the glove box 2.

EXPLANATION OF SYMBOLS 1 an urging device
2 a glove box (a first member)
3 an instrument panel (a second member)
3a an attachment opening portion
4 a box main body
5 a lid
5a a surface panel
5b an inside panel
6 a supporting axis
11 a supporting base
12 turning axes
13 an abutting body
14 a torsion coil spring (an elastic member)
14a a coil portion
14b an arm portion (one end of the elastic member)
14c an arm portion (the other end of the elastic member)
21 bearing portions
21a outer peripheral borders
21b outer peripheral borders
22 concave portions
22a open portions
23 a spring locking block (a locking portion)
23a an upper wall
23b a front wall
30 a convex portion
31 an upper wall
31a, 32a overhang portions (attachment guide portions)
32 a back wall
33 supporting walls
34 a locking claw
41 spring supporting axes
45 a slit
45a a circular portion
45b a linear portion
46 an elastic piece
51 a locking hole
51a a lower border

What is claimed is:

1. An urging device adapted to be interposed between a first member and a second member, comprising:
   a supporting base adapted to be formed on the first member;
   an abutting body including turning axes supported rotatably on the supporting base, and adapted to elastically contact the second member; and
   an elastic member held in the abutting body and urging the abutting body by one end thereof in an elastically contacting direction,
   wherein the supporting base includes bearing portions supporting the turning axes, and a locking portion locking the other end of the elastic member.

2. The urging device according to claim 1, wherein the bearing portions include axis holes to attach the turning axes, one portion of an outer periphery thereof bring open to be capable of inserting the turning axis.

3. The urging device according to claim 2, wherein the elastic member is a torsion coil spring.

4. The urging device according to claim 3, wherein the abutting body includes a pair of supporting walls supporting two ends of a coil portion of the torsion coil spring, and
   wherein in the supporting walls, spring supporting axes inserted into both ends of the coil portion of the torsion coil spring are respectively projected inwardly, and at least one of the supporting walls includes an elastic piece defined by a slit formed around the spring supporting axis.

5. The urging device according to claim 4, wherein the axis holes are defined by concave portions which open inwardly, and the turning axes are projected outwardly from the elastic piece.

6. The urging device according to claim 1, wherein the abutting body surrounds at least one side of the turning axes from an outside, and also includes attachment guide portions slidably contacting outer peripheral borders of the bearing portions.

* * * * *